United States Patent [19]

Roberts

[11] 4,075,453
[45] Feb. 21, 1978

[54] WELDING

[76] Inventor: Paul Donald Roberts, 168 Carmel Road North, Darlington, Durham, England

[21] Appl. No.: 511,034

[22] Filed: Sept. 30, 1974

Related U.S. Application Data

[63] Continuation-in-part of Ser. No. 385,581, Aug. 3, 1973, abandoned.

[30] Foreign Application Priority Data

Aug. 4, 1972 United Kingdom ............... 36616/72

[51] Int. Cl.² ............................................... B23K 9/02
[52] U.S. Cl. .................................. 219/125.1; 219/160
[58] Field of Search ................. 219/137, 136, 160, 73

[56] References Cited

U.S. PATENT DOCUMENTS

| | | | |
|---|---|---|---|
| 1,844,263 | 2/1932 | Priebe | 219/160 |
| 2,331,937 | 10/1943 | Schreiner | 219/160 X |
| 2,362,505 | 11/1944 | Smith | 219/160 X |
| 2,365,226 | 12/1944 | Stout | 219/160 X |
| 2,691,952 | 10/1954 | Wilson et al. | 219/160 X |
| 3,258,185 | 6/1966 | Koch et al. | 219/160 X |
| 3,351,734 | 11/1967 | Arikawa et al. | 219/137 R |
| 3,525,844 | 8/1970 | Johnson | 219/160 X |
| 3,575,574 | 4/1971 | Almqvist | 219/137 R |
| 3,688,080 | 8/1972 | Cartwright et al. | 219/137 R |

FOREIGN PATENT DOCUMENTS 722,070 1/1955 United Kingdom ................. 219/137

OTHER PUBLICATIONS

Metals Handbook, vol. 6, 8th ed., 1971, pp. 253 TA47-2-A3.

Primary Examiner—J. V. Truhe
Attorney, Agent, or Firm—Haseltine, Lake & Waters

[57] ABSTRACT

The invention is a method of butt welding steel plates. The steel plates to be welded are placed closely adjacent to each other. A steel backing strip of segmental cross-section is placed in a recess of a heat-conductive support block and is held against one side of the steel plates while welding is carried out. Welding is carried out by an automatic process on the side of the steel plates opposite to the backing strip. Fusion of the steel plates and the backing strip occur so that all three are welded together. The heat-conductive support block is not welded to the steel plates or the backing strip and is removed.

6 Claims, 2 Drawing Figures

WELDING

This application is a continuation-in-part of application Ser. No. 385,581 filed on Aug. 3, 1973; now abandoned.

BACKGROUND OF THE INVENTION

This invention relates to butt welding steel plates.

The invention is particularly suitable for the assembly on site of bridge box girder units, tanks, caissons, or similar structures from plate panel sub-units fabricated in a manufacturing shop.

DISCUSSION OF THE PRIOR ART

It is conventional practice when butt-welding steel plates of substantial thickness for welding to be done in at least two passes along the butted steel plates, one in the downhand and one in the overhead position. In many cases more than two passes are required. Thus it may be necessary to make a first pass using the manual metal arc welding technique in the downhand position, followed by a second pass which can be made using an automatic welding process such as the submerged arc process, again in the downhand position. The underside of the joint is then ground down to sound metal and further passes are made to fill the resulting groove. As these passes are made in the overhead position, they must be carried out manually. Thus the welding process involves several time-consuming steps and also requires good access to both sides of the steel plates to be welded, as welding is carried out on both sides.

Various attempts have been made to improve upon this process. Thus U.S. Pat. No. 3,575,574 (Almqvist) discloses the use of a trolley which comprises a chassis, a pair of driven wheels and a pair of idle wheels which roll on rails forming a track at the bottom of a trench sunk in a bed provided with magnets for holding the steel sheets to be welded. A pair of brackets attached to the front end of the trolley chassis rotatably support a reel carrying a coiled strip of mild steel. A frame is pivotably supported by pistons of a pair of hydraulic cylinders provided on the chassis. The frame rotatably supports two pressure rollers. A third pressure roller is disposed between the two pressure rollers and is supported by a pair of levers pivotally attached to the frame. The free ends of the levers are connected by a crosspiece. A compression spring is fitted between the crosspiece and the frame and exerts an upward thrust on the intermediate roll. The two pressure rolls have flanges which serve to guide the steel strip. The height of the flanges is less than the thickness of the steel strip, which is therefore pressed into firm engagement with the steel plates by the pressure rolls. In use, the trolley is advanced at the same rate as the welding electrode operating at the upper side of the joint. It will be appreciated that the welding process disclosed in this patent requires complicated and expensive apparatus. Furthermore, although welding is carried out only from one side of the work the described process requires that a trolley on rails should be positioned on the other side of the work. Hence good access is required to both sides of the steel plates. Positioning of the steel strip is carried out as the trolley advances and welding proceeds. This creates a risk that misalignment or displacement of the steel strip and/or steel plates may occur. As the steel strip is required to be coiled, the thickness of the steel strip which can be used is limited. The amount of heat which can be absorbed by the steel strip depends on the thickness of the steel strip, so the amount of heat and hence the welding current which can be used are limited. The only means for conducting heat away from the steel strip is via the pressure rolls. Hence as welding proceeds the pressure rolls will become hotter and hotter and unable to convey heat away from the steel strip, so that there is a risk that complete fusion and "blow-through" of the steel strip will occur on a long weld. In view of this risk, it is necessary to provide a heat sensitive member adapted to sense heat radiation from the backing strip to control the rate at which the trolley is advanced or to control the welding current. It is clear that the process disclosed in U.S. Pat. No. 3,575,574 has disadvantages particularly in that it involves use of expensive and complicated apparatus and requires good access to both sides of the steel plates to be welded. It is certainly not suitable for the assembly on site of bridge box girder units, tanks, caissons, or similar structures from plate panel sub-units fabricated in a manufacturing shop.

SUMMARY OF THE INVENTION

It is an object of the present invention to provide a method of butt welding steel plates in which the welding step can be carried out automatically, welding is carried out only from one side of the steel plates, only limited access is required to the other side of steel plates and complex and expensive apparatus is not required.

According to one aspect of the present invention there is provided a method of butt welding two steel plates which comprises the steps of:

(1) placing the two steel plates so that their fusion faces are closely adjacent to or abut each other;

(2) placing against one side of the junction of the fusion faces a steel backing strip which extends along the junction, the steel backing strip having a cross-section which is a segment of a circle, the flat surface of the strip being in contact with the steel plates on either side of the junction and the strip being free of contact with the fusion faces of the steel plates;

(3) supporting the backing strip in a segmental shaped recess in a heat-conductive support block, the radius of curvature of the recess being substantially the same as the radius of curvature of the curved surface of the backing strip whereby good contact is obtained between the backing strip and the support block for conduction of heat from the backing strip to the support block; and (4) welding together the two plates and the backing strip on the side of the steel plates opposite to the backing strip of an automatic metal arc welding machine using a current in the range of from 350 to 1500 amps.

According to a further aspect of the invention there is provided a method of butt welding steel plates which comprises:

(1) placing two steel plates so that an area of one steel plate is closely adjacent to or abuts an edge of the other steel plate;

(2) placing against one side of the junction formed between the said areas of the two steel plates a face of a steel backing strip which extends along the junction;

(3) supporting the steel backing strip by means of a telescopic spring unit; and (4) welding the steel plates along the joint.

DESCRIPTION OF THE PREFERRED EMBODIMENTS

Figure 1:
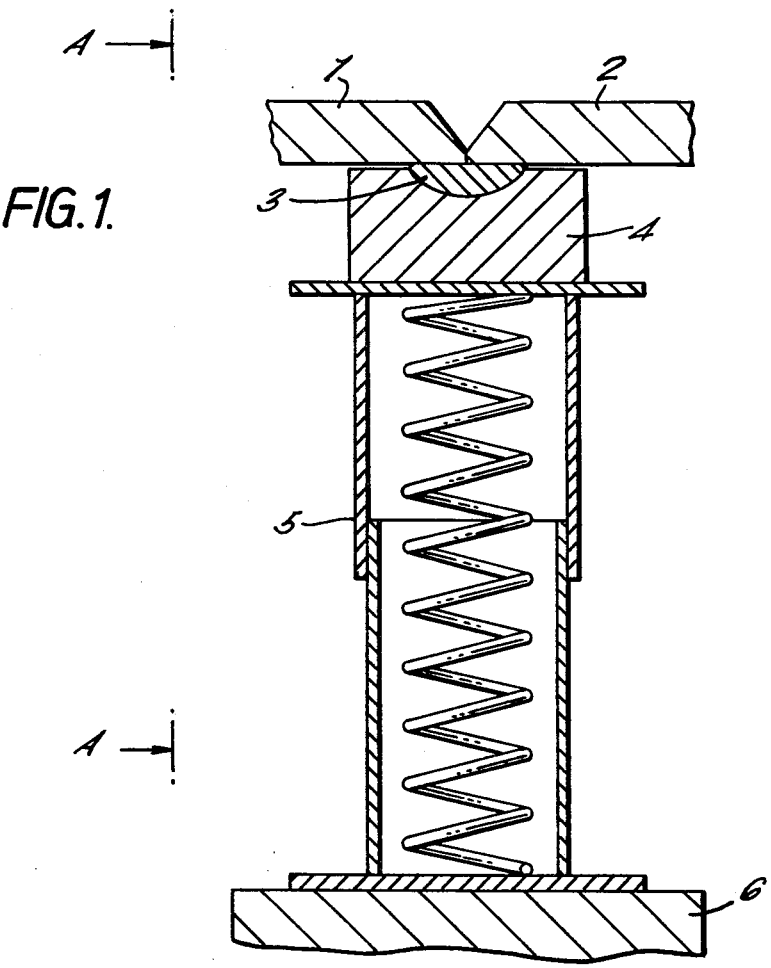

Usually the steel plates to be welded together are positioned with an angle of 180° between them. In this case the face of the backing strip and the face of the support block are both flat and when the backing strip is situated in the recess in the support block the surface of the backing strip is raised above that of the support block to ensure good contact with the steel plates. On some occasions it is desired that the plates to be welded together are positioned with an angle of 90° between them, an edge of one plate being closely adjacent to or abutting a face of the other plate. In this case also the face of the backing strip and the face of the support block are both flat and the backing strip forms a continuous flat surface in contact with the steel plates.

During welding, weld metal penetrates between the steel plates and fixes the steel backing strip to the plates along the junction. The process of the invention is particularly suitable for use where the backing strip can remain welded to the steel plates, although if necessary, the backing strip can be removed by, for example, cutting, chipping or grinding. The support block, which as well as supporting the backing strip acts as a heat sink to absorb heat from the welding operation, does not become fixed to the steel plates or the backing strip and can be readily removed and re-used. Because the support block acts as a heat sink contact between the backing strip and the support block should be over as large an area as possible and the whole surface of the recess should be in contact with the backing strip. Hence the backing strip is segmental in cross-section and the recess in the support block corresponds in shape to the curved portion of the segment. The width of the backing strip is preferably in the range of from 12 to 19 mm and the central thickness is preferably in the range of from 2.5 to 4.76 mm.

The welding process can in many instances be achieved with only one pass of the welding machine, although this depends upon the thickness and type of steel being welded. The invention is intended for use with steel plates whose thickness is in the range of from 3 to 25 mm, more especially 5 to 18 mm, although it is not confined to thicknesses within these limits. As the thickness of the steel is increased, the number of welding passes required is increased. Also, as the thickness of the steel is increased, problems of heat distortion due to one-sided welding are increased. Although these problems can often be overcome, for example by arranging plates to compensate for any distortion, these problems reduce the economic benefit of the invention with thicker steel. With, for example, mild steel plates welding can often be achieved with one pass with plates up to 25 mm in thickness. With high yield steel plates welding can often be achieved with one pass with plates up to 18 mm in thickness. The use of any number of passes to complete the weld is within the scope of the invention.

The steel plates can be welded by any of the electric metal arc welding processes but the submerged arc or coated electrode open arc processes using automatic welding machines are particularly suitable. The preferred processes involve the use of high welding curents which may range from 350 to 1500 amps, depending upon the thickness of the steel plates to be welded. For most purposes currents in the range of from 400 to 850 amps are used.

If necessary, the steel plates may be tack welded prior to the final welding.

The support block and backing strip may be supported by any suitable means but are preferably supported by a telescopic spring unit.

DESCRIPTION OF THE ILLUSTRATED EMBODIMENTS

Figure 2:
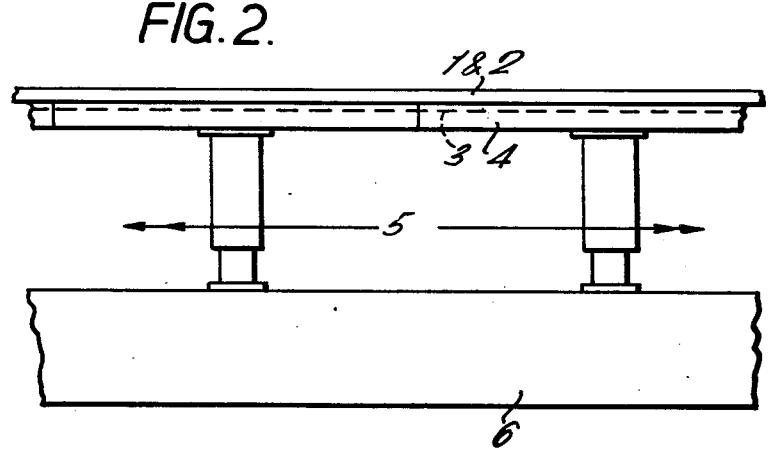

The invention will be further illustrated with reference to the accompanying drawings showing, by way of example, an embodiment of the invention, in which:

FIG. 1 is an end elevation showing the abutting edges of two steel plates to be welded; and FIG. 2 is an elevation looking in the direction A—A shown in FIG. 1.

A steel backing strip 3 of segmental cross-section, suitably 18 mm wide by 5 mm central thickness, having its flat surface uppermost, is applied to the underside of the junction between abutting edges of steel plates 1 and 2. The backing strip 3 is supported by an elongate heat-conductive block 4 of steel which in cross-section is suitably 35 mm wide by 20 mm deep. The steel block 4 has a groove machined in its top face which closely fits the convex underside of the backing strip. The top surface of the backing strip is preferably about 0.5 mm above the top surface of the heat-conductive block 4 to ensure good contact between the backing strip and the steel plates. The support block acts to dissipate heat from the backing strip during welding so that the backing strip does not melt substantially or develop holes and the molten weld metal is confined within the desired zone. The support block 4 does not become attached to the plates or to the backing strip 3 and may be removed on completion of welding for re-use.

Telescopic spring units 5 are used to hold the support blocks 4, the units being placed approximately every 30 cm along the length to be welded. The spring units in turn are supported on a beam 6.

When the abutting edges of the steel plates are positioned and supported as described above the abutting edges are welded by an electric metal arc process. After welding, as stated above the support blocks 4 can be removed for re-use. The backing strip 3 is attached to the welded plates and may be removed or not as desired.

It will be appreciated that welding is carried out only on one side of the steel plates and access to the other side is required only to position the backing strip and heat-conductive support block. This can be done where access is limited and the requirements for access are considerably less demanding than where welding must be carried out on both sides of the steel plates or where a moving trolley is required, as in U.S. Pat. No. 3,575,574. It will also be appreciated that the method of the invention requires no complicated or expensive apparatus.

EXAMPLES

Two steel plates of 9 mm thickness were welded by the process of the invention. A steel backing strip of 19 mm width and 4.76 mm thickness was used. The welding process was an automatic submerged arc process using a welding current of 850 amps, a welding voltage of 30 volts and a welding speed of 400 mm per minute. The welding was achieved in one pass.

I claim:

1. A method of butt welding two steel plates which comprises of steps of:

(1) placing the two steel plates so that their fusion faces are closely adjacent to or abut each other;

(2) placing against one side of the junction of the fusion faces a steel backing strip which extends along the junction, the steel backing strip having a cross-section which is a segment of a circle, the flat surface of the strip being in contact with the steel plates on either side of the junction and the strip being free of concontact with the fusion faces of the steel plates (3) supporting the backing strip in a segmental shaped recess in a heat-conductive support block, the radius of curvature of the recess being substantially the same as the radius of curvature of the curved surface of the backing strip whereby good contact is obtained between the backing strip and the support block for conduction of heat from the backing strip to the support block; and (4) welding together the two plates and the backing strip from the side of the steel plates opposite to the backing strip with an automatic metal arc welding machine using a current in the range of from 350 to 1500 amps.

2. A method according to claim 1 wherein the steel plates to be welded together are positioned with an angle of 180° between them and the face of the backing strip and the face of the support block are both flat and form a continuous flat surface in contact with the steel plates.

3. A method according to claim 1 wherein welding is carried out by the submerged arc process or the coated electrode open arc process using a welding current in the range of from 400 to 1200 amps.

4. A method according to claim 1 in which said supporting step includes resiliently biasing the combination of said support block and said backing strip against said plates.

5. A method according to claim 1 which comprises employing steel plates whose thickness is in the range of from 3 to 25 mm.

6. A method according to claim 1 which comprises employing a backing strip whose width is in the range of from 12 to 19 mm and whose central thickness is in the range of from 2.5 to 4.76 mm.

* * * * *